United States Patent [19]

Lutterotti

[11] Patent Number: 5,250,334
[45] Date of Patent: Oct. 5, 1993

[54] COFFEE WEB

[75] Inventor: Mario Lutterotti, Whitby, Canada

[73] Assignee: Du Pont Canada Inc., Mississauga, Canada

[21] Appl. No.: 895,487

[22] Filed: Jun. 8, 1992

[30] Foreign Application Priority Data

Jun. 5, 1991 [GB] United Kingdom ................. 9112053

[51] Int. Cl.$^5$ .......................... B65D 1/00; B35B 15/08
[52] U.S. Cl. .................... 428/35.9; 428/458; 428/475.5; 428/480
[58] Field of Search ............ 428/216, 458, 480, 475.5, 428/35.9

[56] References Cited

U.S. PATENT DOCUMENTS 4,228,215 10/1980 Hein, III et al. .................... 428/216

FOREIGN PATENT DOCUMENTS

| 553590 | 2/1959 | Canada. |
| 764942 | 8/1967 | Canada. |
| 835896 | 3/1970 | Canada. |
| 0372886 | 6/1990 | European Pat. Off.. |
| 61-167550 | 7/1986 | Japan. |

Primary Examiner—Thomas J. Herbert, Jr.

[57] ABSTRACT

A laminate, suitable for packaging coffee, is disclosed. It consists of a) a base film of biaxially oriented polyester film or biaxially oriented nylon film, b) a gas barrier layer of aluminum and c) an oriented linear low density polyethylene film. The polyethylene is selected from the group consisting of at least one ethylene/$C_4$-$C_{10}$ α-olefin copolymer having a density of from 0.905 to 0.940 g/cm$^3$ and blends of such copolymer with a second polymer selected from at lest one of a homopolymer of ethylene and a copolymer of ethylene and vinyl acetate. The second polymer has a density of from 0.910 to 0.940 g/cm$^3$, and the blend has up to 70 wt. % of the second polymer.

2 Claims, No Drawings

COFFEE WEB

The invention relates to film laminates suitable for making packages for aromatic materials such as coffee.

It is well known to package coffee and similar materials in laminated film structures. For example a common laminate structure consists of polyethylene terephthalate film/aluminium foil/biaxially oriented nylon film/unoriented linear low density polyethylene film or aluminized polyethylene terephthalate film/biaxially oriented nylon film/unoriented linear low density polyethylene film. For reasons of cost of manufacture it would be desirable to have fewer layers than currently used. This has not been easy to accomplish because of the requirements that the laminate structure have excellent moisture, gas and aroma barrier properties and also be strong enough to withstand puncturing and flexing of the laminate without losing these barrier properties. Large numbers of film laminates are known but heretofore none have been used or proved suitable for the present purpose.

Canadian Patent 764 942 to A. A. Ritchie, which issued 1967 August 8 discloses the lamination of two monoaxially oriented thermoplastic films, with the directions of orientation essentially at right angles to one another. Such a laminate is disclosed as having improved resistance to tear. Ethylene/butene copolymer films, stretched 4.5 times in the machine direction, are exemplified.

U.S. Pat. No. 4 228 215, which issued 1980 October 14 to American Can Co. discloses a laminated film comprising a uniaxially oriented base film and a substantially unoriented heat-sealing film. The base film, about 12-63 μm in thickness, is selected from high density polyethylene, low density ethylene/vinyl acetate copolymer, ethylene/vinyl alcohol copolymer or polyamide resin. The heat-sealing film is produced from a copolymer of ethylene/acrylic acid, polyvinylchloride resin or polyvinylidene chloride resin. A curable adhesive of polyurethane-polyester is used for the laminating process. The film has a thickness ratio of heat seal film to base film of 0.5-1.5:1.0 and is biaxially tearable.

Japanese Kokai 61(1986)-167550 to Sakai et al., published 1986 July 29, discloses packages made from a composite film of a substrate sheet, e.g. aluminium foil or paper, adhesively bonded to a 10–100 μm uniaxially oriented polyethylene film having a density of less than 0.94 g/cm$^3$ stretched in the longitudinal or transverse directions from 6 to 20 times. The sealant layer of the composite is the oriented polyethylene film and the easy tear direction is indicated as being in the direction of stretch of the film. In Example 2 there is disclosed a 12 μm biaxially oriented polyester laminated to a 7 μm aluminium foil, which in turn is laminated to a 30 μm oriented linear low density polyethylene film.

Canadian Patent 553 590 to W. E. F. Gates, which issued 1958 February 25 discloses a polyester film laminated to a metal foil, and polyethylene extrusion coated onto the foil. It further discloses a polyethylene terephthalate film laminated to a film of polyethylene. The laminate is characterised as having low gas, moisture vapour and odour permeabilities and as being strong and chemically resistant.

Canadian Patent 835 896 to A. F. Turbak, which issued 1970 March 3, discloses a casing suitable for packaging comminuted meat, comprising a metal foil coated on opposite sides with continuous layers of thermoplastic materials, at least one layer being heat sealable. The heat sealable coating may be polyethylene, polyvinyl acetate, polyvinylidene chloride. The other layer may be a heat sealable layer or polypropylene or polyester.

European Patent Application 89.312622.7 filed 1989 December 4 to T. J. Lang and K. Bergevin relates to a polyethylene film laminate which is relatively easily tearable in the transverse direction. The laminate comprises a machine direction oriented linear low density polyethylene film laminated on at least one side to a heat sealable film. For packaging materials requiring flavour, aroma, oxygen barrier properties or the like, it is disclosed that the oriented or the sealant film may be coated with a suitable coating such as aluminium, ethylene/vinyl alcohol copolymer or polyvinylidene chloride.

There is a need for a film laminate which is made inexpensively and which is strong, has excellent puncture and stress crack resistance and has one ply which is heat sealable.

Accordingly the present invention provides a laminate consisting of a) a base film of biaxially oriented polyester film or biaxially oriented nylon film, b) a gas barrier layer of aluminium and c) an oriented linear low density polyethylene film wherein the polyethylene is selected from the group consisting of at least one ethylene/$C_4$–$C_{10}$ α-olefin copolymer having a density of from 0.905 to 0.940 g/cm$^3$ and blends of such copolymer with a second polymer selected from at least one of a homopolymer of ethylene and a copolymer of ethylene and vinyl acetate, said second polymer having a density of from 0.910 to 0.945 g/cm$^3$, said blend having up to 70 wt. % of said second polymer.

In another embodiment the oriented film is made from an ethylene/$C_6$–$C_{10}$ α-olefin copolymer, especially an ethylene/$C_6$–$C_8$ α-olefin copolymer.

In yet another embodiment the oriented film is made from at least 65 wt. % ethylene/$C_6$–$C_{10}$ α-olefin copolymer, from 0 to 30 wt % high pressure polyethylene and up to 25 wt. % ethylene/vinyl acetate copolymer, all percentages adding to 100.

In a further embodiment the oriented film is made from a polymer containing ethylene/octene-1 copolymer.

In another embodiment the oriented film has a density of from 0.916 to 0.924 g/cm$^3$.

In another embodiment the oriented film has been oriented in the machine direction at a draw ratio of from 1.5 to 5.0. Especially preferred is a draw ratio of from 3.5 to 5.0.

In a further embodiment the ethylene/vinyl acetate copolymer has a vinyl acetate content of from 10 to 14 mole %.

In yet another embodiment the polyester is polyethylene terephthalate.

In another embodiment the layer of aluminium is provided by at least one of the films in the laminate being metallized.

In yet another embodiment the layer of aluminium is an aluminium foil between the polyester film and the oriented polyethylene film.

Density of the ethylene polymers is performed on samples of film and is determined using ASTM Procedure D 1505-68.

The present invention also provides a package of a particulate oxygen-sensitive solid packaged in a laminate of a) a base film of biaxially oriented polyester film or biaxially oriented nylon film, b) a gas barrier layer of aluminium and c) an oriented linear low density polyethylene film wherein the polyethylene is selected from the group consisting of at least one ethylene/$C_4$-$C_{10}$ α-olefin copolymer having a density of from 0.905 to 0.940 g/cm$^3$ and blends of such copolymer with a second polymer selected from at least one of a homopolymer of ethylene and a copolymer of ethylene and vinyl acetate, said second polymer having a density of from 0.910 to 0.940 g/cm$^3$, said blend having up to 70 wt. % of said second polymer.

The term oxygen-sensitive refers to solids which are subject to deterioration from the presence of oxygen. It includes those solids which give off an strong aroma such as coffee, and also includes nonaromatic solids such as yeast. In another embodiment the oriented film is made from an ethylene/$C_6$-$C_{10}$ α-olefin copolymer, especially an ethylene/$C_6$-$C_8$ α-olefin copolymer.

In yet another embodiment the oriented film is made from at least 65 wt. % ethylene/$C_6$-$C_{10}$ α-olefin copolymer, from 0 to 30 wt % high pressure polyethylene and up to 20 wt. % ethylene/vinyl acetate copolymer, all percentages adding to 100.

In a further embodiment the oriented film is made from a polymer containing an ethylene/octene-1 copolymer.

In another embodiment the oriented film has a density of from 0.916 to 0.924 g/cm$^3$.

In another embodiment the oriented film has been oriented in the machine direction at a draw ratio of from 1.5 to 5.0. Especially preferred is a draw ratio of from 3.5 to 5.0.

In yet another embodiment the polyester is polyethylene terephthalate.

In another embodiment the layer of aluminium is provided by at least one of the films in the laminate being metallized.

In yet another embodiment the layer of aluminium is an aluminium foil between the polyester film and the oriented polyethylene film.

The linear ethylene/α-olefin copolymers used in the manufacture of the oriented film may be made from ethylene and the α-olefin by a process disclosed in Canadian Patent 856 137 which issued 1970 November 7 to W. E. Baker, I. C. B. Saunders and J. M. Stewart. Other processes may also be used to produce the linear ethylene/α-olefin copolymer. The preferred copolymer is ethylene/octene-1 copolymer. The second polymer, if linear, may also be manufactured using the same process.

The second polymer may be made by any of the known processes for making the appropriate ethylene polymer. For example, ethylene homopolymer may be made by high pressure or low pressure processes and may be a linear polymer or otherwise. The second polymer may be a blend of an ethylene homopolymer and an ethylene/vinyl acetate copolymer.

The oriented film may be made by known machine direction orientation processes, in which the film is stretched in the machine direction at a temperature below the melting temperature of the film. The oriented film may first be made using the so-called blown film process, and then machine direction orienting the film directly thereafter or in a separate step. A blown film process is disclosed in Canadian Patent 460 963 which issued 1949 November 8 to E. D. Fuller. In other blown film processes, the film may be made using an internal or external cooling mandrel as disclosed, for example, in Canadian Patent 893 216 which issued 1972 February 15 to M. Bunga and C. V. Thomas. The blown film process, by itself, is insufficient to impart the required degree of machine direction orientation, and further stretching, at a temperature below the melting temperature of the film is required.

The machine direction orientation may be accomplished by stretching an essentially unoriented ethylene/$C_4$-$C_{10}$ α-olefin film between first and second pairs of orientation rolls. Preferably the ratio of the peripheral speed of the second of such rolls to that of the first of such rolls, sometimes referred to as the draw ratio, is from about 1.5 to about 5.0, especially from about 3.5 to 5.0, and even more especially from 4.0 to 4.5.

Although it is not essential, it is preferred that each orientation roll have a nip roll associated therewith, said nip rolls applying substantially uniform force across the width of such nip rolls onto the associated orientation roll. It is also preferred that the distance between the nip rolls be as small as possible. For example, a distance between nip rolls of from 100 to 2050 μm is preferred, and especially from 500 to 1500 μm. It is further preferred that the temperature of the orientation rolls be held at from 40° to 80° C. The optimum orientation temperature depends in part upon the density of the film being oriented. For example it is preferred to orient an ethylene/octene-1 film having a density of 0.920 g/cm$^3$ at about 55° C., whereas it is preferred to orient a similar film having a density of 0.930 g/cm$^3$ at 75° C. It is preferred that the nip rolls be placed as close to the minimum gap between the first and second orientation rolls as the diameters of the orientation and nip rolls will allow. Annealing of the film is desirable but not necessary.

The film composites useful in the present invention may be made by conventional techniques of adhesively laminating the sealant films to the first film. An example of an adhesive which may be used is a urethane-based adhesive. The laminating adhesive and the laminating process must be sufficient to bond the layers of the laminate together so that they do not delaminate.

It will be understood by those skilled in the art that additives, e.g. UV stabilizers, anti-block agents, slip additives, may be added to the polymers from which the films are made.

The laminate is particularly useful for packaging coffee and the like.

EXAMPLE I

Several oriented films were prepared from a blend of a) 68.0 wt. % linear ethylene/octene-1 copolymer having a density of 0.920 g/cm$^3$ and a melt index of 0.70, b) 13.0 wt % high pressure polyethylene having a density of 0.919 g/cm$^3$ and a melt index of 6.3, and c) 15 wt. % of an ethylene/vinyl acetate copolymer having a density of 0.940 g/cm$^3$, a melt index of 0.35 and a vinyl acetate content of 12%. The blend was first formed into film using a blown film process. Several samples of the film were subsequently machine direction oriented at different draw ratios in the range of 4.2 to 4.5. Density of the films were measured.

The oriented films were adhesively laminated to an aluminized biaxially oriented polyethylene terephthalate film, using a urethane adhesive in a gravure coating process. The film laminates were tested after about 2 weeks.

Puncture strengths were measured using a procedure of forcing a piston tip, having a diameter of 12.7 mm through a sample of the film laminate, and measuring the force required to pentrate the laminate. The piston tip was attached to the crosshead of an Instron (trade mark) tester in which the crosshead travel was adjusted to 0.847 cm/s. The strengths are expressed in kilograms.

Flex crack was measured using a modified Gelbo flex measurement using 21.6 cm by 31.75 cm samples of the laminates. The samples were clamped in tubular configurations between fixed and moveable heads of the tester. The moveable head cycled forward 11.4 cm while rotating 400° at a rate of 40 cycles per minute. The samples were subjected to 3000 cycles each. The number of pinholes was determined by taping the laminate to a blotting material and painting the laminate with a solution of 1 g Bayer (trade mark) red 7B dye and 5 g calcium chloride in 100 ml turpentine. After the dye was dry, the laminate was removed and the dye spots on the blotting material counted.

Samples of the film laminates were also taken and heat sealed using a Sentinel (trade mark) heat sealer, having a 6.35 mm wide sealing bar, and set with a jaw pressure of 138 kPa for 0.25 s. Heat seal strengths were measured using a Suter (trade mark) tester in which the fall of the plunger was set at 5.08 mm/s.

Hot tack strengths were measured during sealing using the method disclosed in Canadian Patent 1 181 613 which issued 1985 January 29 to P. H Gray and D. C. King. The results are of the tests are shown in Table 1.

TABLE 1

| Laminate | Puncture Strength | | Heat Seal Strength | Hot Tack[1] |
| | Round Probe | Sharp Probe | | |
| --- | --- | --- | --- | --- |
| A | 16.4 | 4.3 | 1970 | 500 |
| B | 28.4 | 6.3 | | |
| C | 12.1 | 3.7 | | |
| D | 19.5 | 5.3 | | |
| E | 23.2 | 5.0 | | |
| F | 18.3 | 5.9 | | |

[1]138 kPa for 1.0 s.

Laminates A, B and F are embodiments of the present invention and laminates C, D and E are of the prior art and are included for comparative purposes. Laminate A has metallized 12 μm biaxially oriented polyethylene terephthalate film laminated to oriented 76 μm linear low density ethylene/octene-1 copolymer film. Laminate B has 15 μm oriented nylon 6,6 film sandwiched between metallized 12 μm biaxially oriented polyethylene terephthalate film and 76 μm oriented linear low density ethylene/octene-1 copolymer film. Laminate C consists of 9 μm aluminium foil laminated on one side to 12 μm biaxially oriented polyethylene terephthalate film and on the other side to 76 μm blown linear low density ethylene/octene-1 copolymer film. Laminate D consists of 15 μm oriented nylon 6 laminated on one side to metallized 12 μm biaxially oriented polyethylene terephthalate film and on the other side to 76 μm blown linear low density ethylene/octene-1 copolymer film. Laminate E consists of 12 μm biaxially oriented polyethylene terephthalate film/9 μm aluminium foil/15 μm oriented nylon 6 film/76 μm blown low density ethylene/octene-1 copolymer film. Laminate F consists of 12 μm biaxially oriented polyethylene terephthalate film/9 μm aluminium foil/76 μm oriented low density ethylene/octene-1 copolymer film.

Laminates A, B, D, E and F were tested for flex crack resistance the Gelbo flex measurement. The results are shown in Table 2.

TABLE 2

| Laminate | Gelbo Flex[1] |
| --- | --- |
| A | 0, 0, 0, 0, 0, 0, 2, 11 |
| B | 0, 0, 0, 0, 0, 0, 0, 1 |
| D | 11, 7, 6, 9, 12, 14, 7, 8 |
| E | 12, 13, 14, 10, 22, 12, 8, 20 |
| F | 0, 1, 1, 2 |

[1]pinholes/645 cm$^2$/3000 cycles

I claim:

1. A laminate consisting of a) a base film of biaxially oriented polyester film or biaxially oriented nylon film, b) a gas barrier layer of aluminum and c) an oriented linear low density polyethylene film having a draw ratio of from about 1.5 to about 5.0, wherein the polyethylene is selected from the group consisting of at least one ethylene/$C_4$-$C_{10}$ α-olefin copolymer having a density of from 0.905 to 0.940 g/cm$^3$ and blends of such copolymer with a second polymer selected from at least one of a homopolymer of ethylene and a copolymer of ethylene and vinyl acetate, said second polymer having a density of from 0.910 to 0.945 g/cm$^3$, said blend having up to 70 wt. % of said second polymer.

2. A package of a particulate oxygen-sensitive solid packaged in a laminate of a) a base film of biaxially oriented polyester film or biaxially oriented nylon film, b) a gas barrier layer of aluminum and c) an oriented linear low density polyethylene film having a draw ratio of from about 1.5 to about 5.0, wherein the polyethylene is selected from the group consisting of at least one ethylene/$C_4$-$C_{10}$ α-olefin copolymer having a density of from 0.905 to 0.940 g/cm$^3$ and blends of such copolymer with a second polymer selected from at least one of a homopolymer of ethylene and a copolymer of ethylene and vinyl acetate, said second polymer having a density of from 0.910 to 0.945 g/cm$^3$, said blend having up to 70 wt. % of said second polymer.

* * * * *